United States Patent
Ogasahara et al.

(10) Patent No.: US 8,890,942 B2
(45) Date of Patent: Nov. 18, 2014

(54) CAMERA MODULE, IMAGE PROCESSING APPARATUS, AND IMAGE PROCESSING METHOD

(71) Applicant: Kabushiki Kaisha Toshiba, Tokyo (JP)

(72) Inventors: Takayuki Ogasahara, Kanagawa (JP); Katsuo Iwata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 13/750,124

(22) Filed: Jan. 25, 2013

(65) Prior Publication Data

US 2013/0201391 A1 Aug. 8, 2013

(30) Foreign Application Priority Data

Feb. 3, 2012 (JP) ................................ 2012-021951

(51) Int. Cl.
*H04N 13/04* (2006.01)
*G03B 13/00* (2006.01)
*H04N 5/225* (2006.01)
*H04N 5/232* (2006.01)

(52) U.S. Cl.
CPC ......... *H04N 5/2254* (2013.01); *H04N 5/23212* (2013.01); *H04N 5/2258* (2013.01); *H04N 5/2257* (2013.01)
USPC ........................................... 348/51; 348/345

(58) Field of Classification Search
CPC ... H04N 5/23212; H04N 13/021; G02B 7/102
USPC .............. 348/46–54, 265, 345, 362; 382/254, 382/260, 154
See application file for complete search history.

(56) References Cited

U.S. PATENT DOCUMENTS

| | | | |
|---|---|---|---|
| 7,260,243 B2 * | 8/2007 | Shibayama | 382/103 |
| 7,483,065 B2 | 1/2009 | Gruhlke et al. | |
| 2011/0013000 A1 * | 1/2011 | Mori | 348/51 |
| 2011/0316981 A1 * | 12/2011 | Iwabuchi et al. | 348/49 |
| 2013/0016251 A1 | 1/2013 | Ogasahara | |
| 2013/0250109 A1 * | 9/2013 | Yokota | 348/148 |

FOREIGN PATENT DOCUMENTS

| | | |
|---|---|---|
| JP | 4-329074 | 11/1992 |
| JP | 2000-23016 | 1/2000 |
| JP | 2008-524924 | 7/2008 |
| JP | 2011-99779 | 5/2011 |

OTHER PUBLICATIONS

U.S. Appl. No. 13/458,135, Apr. 27, 2012, Takayuki Ogasahara.

* cited by examiner

*Primary Examiner* — Mekonnen Dagnew
(74) *Attorney, Agent, or Firm* — Oblon, Spivak, McClelland, Maier & Neustadt, L.L.P.

(57) ABSTRACT

According to one embodiment, an image processing apparatus includes a refocus filter generating unit and a refocus image generating unit. The refocus image generating unit executes a filtering process using a refocus filter generated by the refocus filter generating unit. A filtering level of the refocus filter is adjusted according to a subject distance of a subject to be focused and sighted among a plurality of subjects projected in a first image and a second image.

18 Claims, 12 Drawing Sheets

FIG.8

| B | G1 | B |
|---|----|---|
| G4 | R | G2 |
| B | G3 | B |

FIG.9

| R | G1 | R |
|---|----|---|
| G4 | B | G2 |
| R | G3 | R |

FIG.13

| | SECOND BRIGHTNESS INFORMATION (SECOND IMAGE SENSOR) | FIRST BRIGHTNESS INFORMATION (FIRST IMAGE SENSOR) |
|---|---|---|
| TYPE 1 | W W W W<br>W W W W<br>W W W W<br>W W W W | G G G G<br>G G G G<br>G G G G<br>G G G G |
| TYPE 2 | G G G G<br>G G G G<br>G G G G<br>G G G G | G G G G<br>G G G G<br>G G G G<br>G G G G |
| TYPE 3 | G G G G<br>G G G G<br>G G G G<br>G G G G | R R R R     B B B B<br>R R R R + B B B B<br>R R R R     B B B B<br>R R R R     B B B B |
| TYPE 4 | G G G G<br>G G G G<br>G G G G<br>G G G G | C C C C     Y Y Y Y<br>C C C C + Y Y Y Y<br>C C C C     Y Y Y Y<br>C C C C     Y Y Y Y |

FIG.14

| B | R | B | R |
|---|---|---|---|
| R | B | R | B |
| B | R | B | R |
| R | B | R | B |

FIG.15

| C | Y | C | Y |
|---|---|---|---|
| Y | C | Y | C |
| C | Y | C | Y |
| Y | C | Y | C |

FIG.16

|  | C1 |  |
|---|---|---|
| C4 | Y | C2 |
|  | C3 |  |

FIG.17

|  | Y1 |  |
|---|---|---|
| Y4 | C | Y2 |
|  | Y3 |  |

CAMERA MODULE, IMAGE PROCESSING APPARATUS, AND IMAGE PROCESSING METHOD

CROSS-REFERENCE TO RELATED APPLICATIONS

This application is based upon and claims the benefit of priority from Japanese Patent Application No. 2012-21951, filed on Feb. 3, 2012; the entire contents of all of which are incorporated herein by reference.

FIELD

Embodiments described herein relate generally to a camera module, an image processing apparatus, and an image processing method.

BACKGROUND

Camera modules are known to include a refocus function of re-adjusting a focus to an arbitrary position as one of devices for implementing high performance. For example, the camera modules including the refocus function are known to include a sub-lens array disposed between an image sensor and a main lens system that introduces light from a subject to an image sensor.

The camera module is required to accurately secure a distance from an image sensor at the time of installation of the sub-lens array in order to obtain accurate depth information of a subject. When the positioning accuracy of the sub-lens array is low, it is difficult to obtain a high-quality image by image processing. It is desirable that the camera module implements the refocus function by a simple configuration.

BRIEF DESCRIPTION OF THE DRAWINGS

FIGS. 8 and 9 are diagrams for describing generation of first brightness information in a brightness information generating unit;

FIG. 13 is a chart for describing a modified example related to acquisition of synthesized brightness information by synthesis of first brightness information and second brightness information;

FIG. 14 is a diagram for describing an arrangement of pixels in a color image sensor used in a type 3;

FIG. 15 is a diagram for describing an arrangement of pixels in a first image sensor used in a type 4;

FIG. 16 is a diagram for describing a calculation of a brightness value of a C component on a Y pixel;

FIG. 17 is a diagram for describing a calculation of a brightness value of a Y component on a C pixel;

DETAILED DESCRIPTION

In general, according to one embodiment, a camera module includes a first imaging lens, a second imaging lens, a first image sensor, a second image sensor, and an image processing apparatus. The first and second imaging lenses introduce light from a subject. The first and second imaging lenses form subject images, respectively. The first image sensor acquires a first image by imaging the subject image formed by the first imaging lens. The first image sensor outputs a first image signal. The second image sensor acquires a second image by imaging the subject image formed by the second imaging lens. The second image sensor outputs a second image signal. The image processing apparatus executes signal processing on the first image signal from the first image sensor and the second image signal from the second image sensor. The image processing apparatus includes a parallax amount calculating unit, a subject distance calculating unit, a refocus filter generating unit, and a refocus image generating unit. The parallax amount calculating unit calculates a parallax amount between the first image and the second image based on the first image signal and the second image signal. The subject distance calculating unit calculates a subject distance from a subject based on the parallax amount calculated by the parallax amount calculating unit. The refocus filter generating unit generates a refocus filter. A filtering level of the refocus filter is adjusted according to the subject distance of the subject to be focused and sighted among a plurality of subjects projected in the first image and the second image. The refocus image generating unit executes a filtering process using the refocus filter generated by the refocus filter generating unit. The refocus image generating unit generates a refocus image.

Exemplary embodiments of a camera module, an image processing apparatus, and an image processing method will be explained below in detail with reference to the accompanying drawings. The present invention is not limited to the following embodiments.

Figure 1:
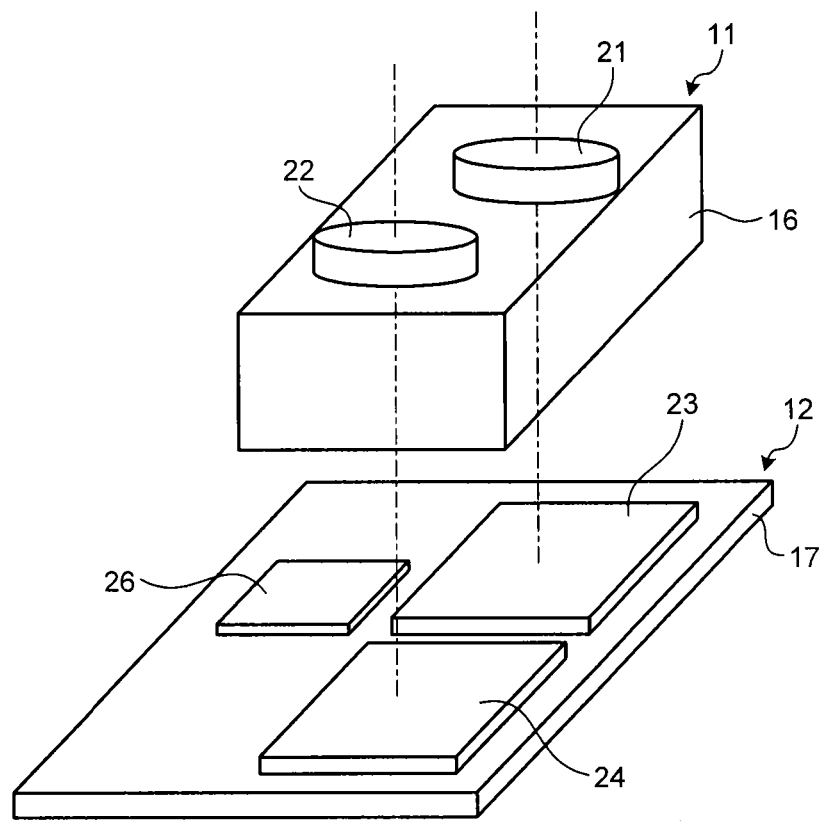
FIG. 1 is a perspective view schematically illustrating a partial configuration of a camera module according to a first embodiment.
Figure 2:
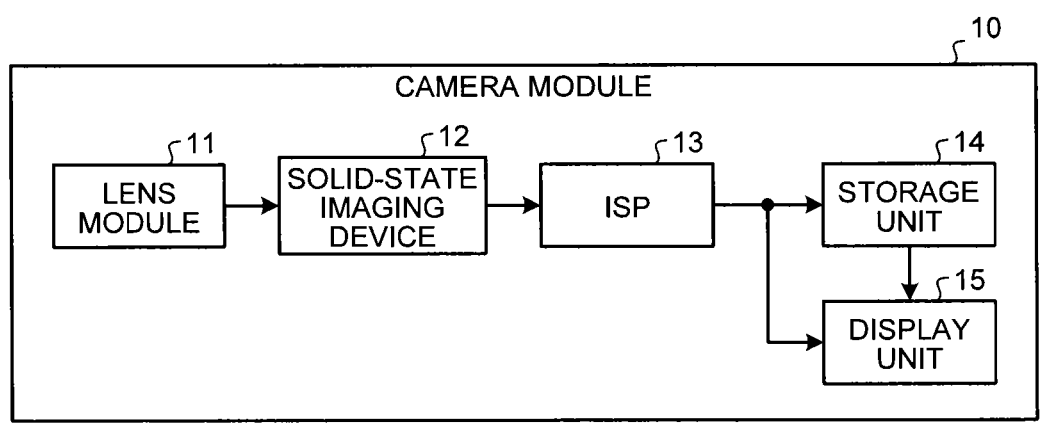
FIG. 2 is a block diagram illustrating a schematic configuration of a camera module.

FIG. 1 is a perspective view schematically illustrating a partial configuration of a camera module according to a first embodiment. FIG. 2 is a block diagram illustrating a schematic configuration of a camera module. A camera module 10 includes a lens module 11, a solid-state imaging device 12, an image signal processor (ISP) 13, a storage unit 14, and a display unit 15.

The lens module 11 introduces light from a subject and forms a subject image. The solid-state imaging device 12 images a subject image. The ISP 13 executes signal processing of an image signal obtained by imaging by the solid-state imaging device 12. The storage unit 14 stores an image that has been subjected to signal processing by the ISP 13. The storage unit 14 outputs an image signal to the display unit 15 in response to a user's operation or the like. The display unit 15 displays an image according to the image signal input from the ISP 13 or the storage unit 14. For example, the display unit 15 includes a liquid crystal display (LCD) device.

Figure 3:
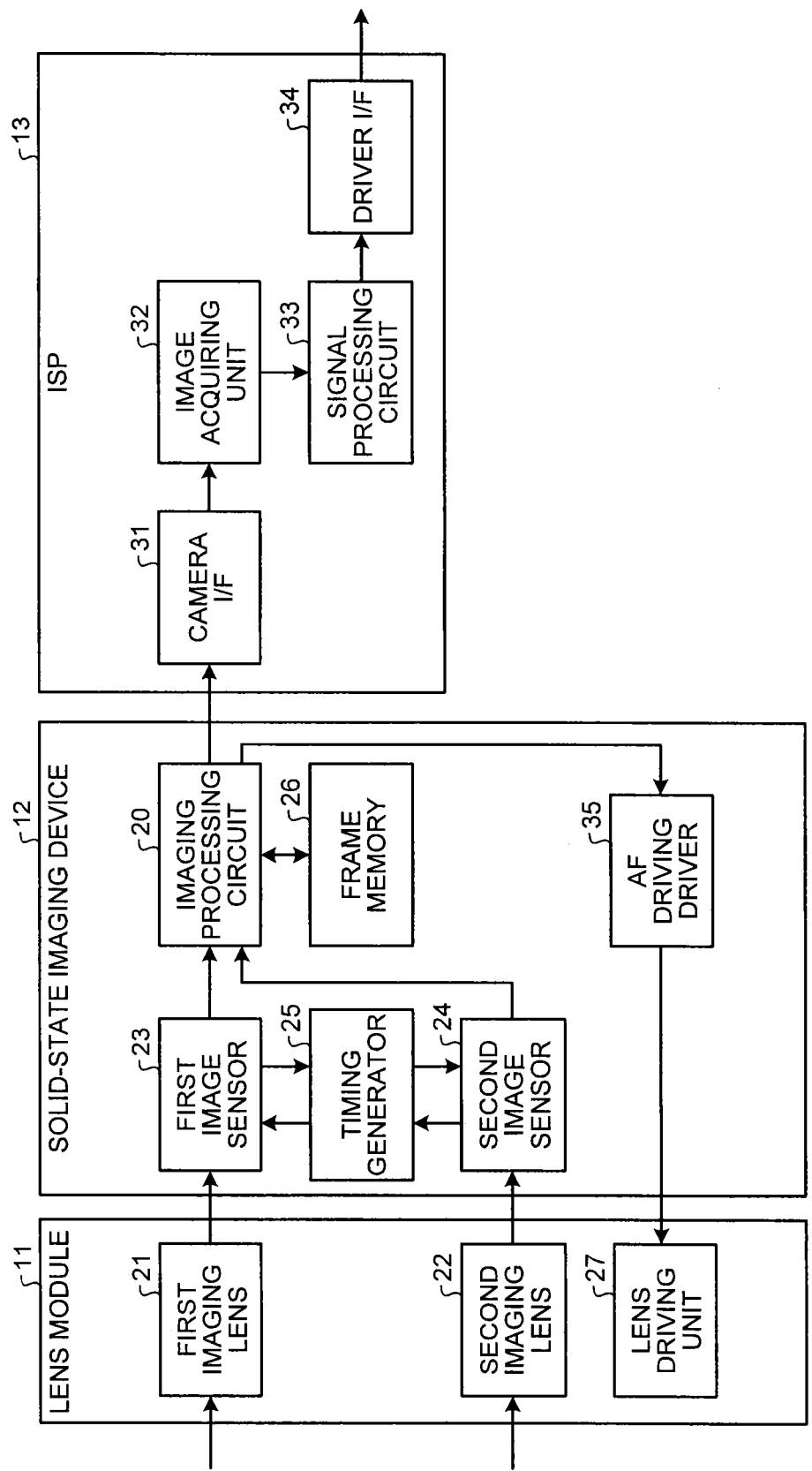
FIG. 3 is a block diagram illustrating the details of a lens module, a solid-state imaging device, and an ISP.

FIG. 3 is a block diagram illustrating the details of the lens module, the solid-state imaging device, and the ISP. The lens module 11 includes a first imaging lens 21, a second imaging lens 22, and a lens driving unit 27. The first imaging lens 21 introduces light from a subject and causes the light to be incident on a first image sensor 23. The second imaging lens 22 introduces light from a subject and causes the light to be incident on a second image sensor 24.

As illustrated in FIG. 1, the first imaging lens 21 and the second imaging lens 22 are mounted in a common lens holder 16. For example, the first imaging lens 21 and the second imaging lens 22 are mounted in the lens holder 16 in a state in which the first imaging lens 21 and the second imaging lens 22 are held in lens barrels, respectively. The first imaging lens 21 and the second imaging lens 22 are arranged in a direction vertical to an optical axis of the first imaging lens 21 and an optical axis of the second imaging lens 22, which are represented by alternate long and short dash lines in FIG. 1.

The solid-state imaging device 12 includes an imaging processing circuit 20, the first image sensor 23, the second image sensor 24, a timing generator 25, a frame memory 26, and an auto-focus (AF) driving driver 35.

For example, the first image sensor 23 is a color image sensor that detects a plurality of pieces of color light. For example, the first image sensor 23 includes R pixels, G pixels, and B pixels which are arranged in a Bayer array form. The R pixel detects light of a red (R) component. The G pixel detects light of a green (G) component. The B pixel detects light of a blue (B) component. The first image sensor 23 outputs RAW image data. The RAW image data is a first image signal according to an intensity distribution of each color light incident from a subject.

For example, the second image sensor 24 is a monochrome image sensor that detects white light. The second image sensor 24 includes W pixels which are arranged in an array form. The W pixel detects white (W) light. The second image sensor 24 outputs monochrome image data. The monochrome image data is a second image signal according to a brightness distribution of light incident from a subject. For example, the first image sensor 23 and the second image sensor 24 employ a transmission scheme by low voltage differential signaling (LVDS).

The imaging processing circuit 20 executes signal processing on the RAW image data from the first image sensor 23 and the monochrome image data from the second image sensor 24. The imaging processing circuit 20 outputs synthesized image data obtained by synthesizing the RAW image data with the monochrome image data.

The frame memory 26 stores at least one of the RAW image data and the monochrome image data input to the imaging processing circuit 20. The frame memory 26 is used for parallax correction which will be described later and may be also used for high dynamic range (HDR) processing, image stabilization, and the like.

As illustrated in FIG. 1, the first image sensor 23, the second image sensor 24, and the frame memory 26 are arranged on a common printed substrate 17. The first imaging lens 21 is arranged to face the first image sensor 23. The second imaging lens 22 is arranged to face the second image sensor 24.

The first image sensor 23, the second image sensor 24, and the frame memory 26 are intensively arranged on the common printed substrate 17, and thus the camera module 10 has a configuration suitable for miniaturization. The timing generator 25 generates a frame timing to be applied to the RAW image data and the monochrome image data.

The AF driving driver 35 controls the lens driving unit 27 in response to an instruction from the imaging processing circuit 20. The AF driving driver 35 functions as a focus driving control unit that controls focus driving of the first imaging lens 21 and the second imaging lens 22.

Figure 4:
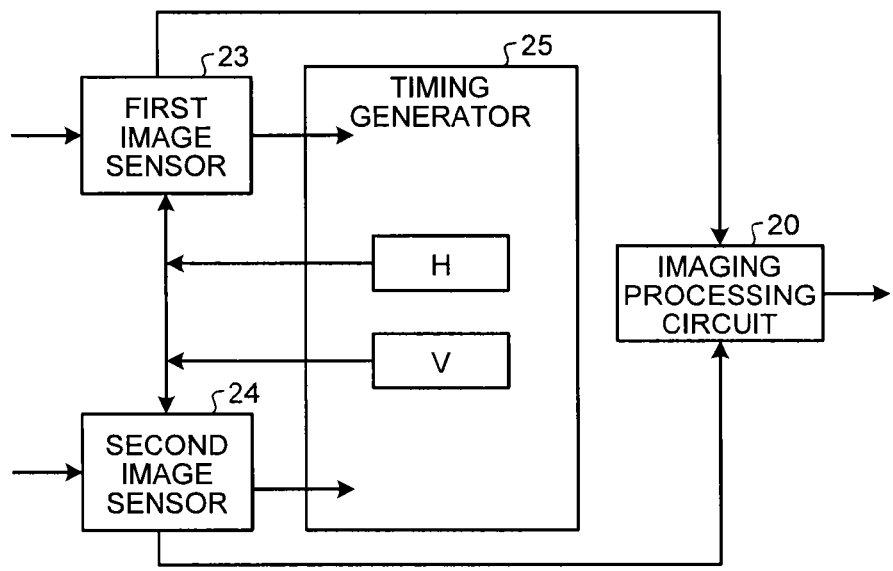
FIG. 4 is a block diagram for describing adjustment of a frame timing by a timing generator.

FIG. 4 is a block diagram for describing adjustment of a frame timing by a timing generator. The timing generator 25 generates a horizontal synchronous signal H and a vertical synchronous signal V. The first image sensor 23 matches a frame timing with the horizontal synchronous signal H and the vertical synchronous signal V, and then outputs the RAW image data. The second image sensor 24 matches a frame timing with the horizontal synchronous signal H and the vertical synchronous signal V, and then outputs the monochrome image data.

Figure 5:
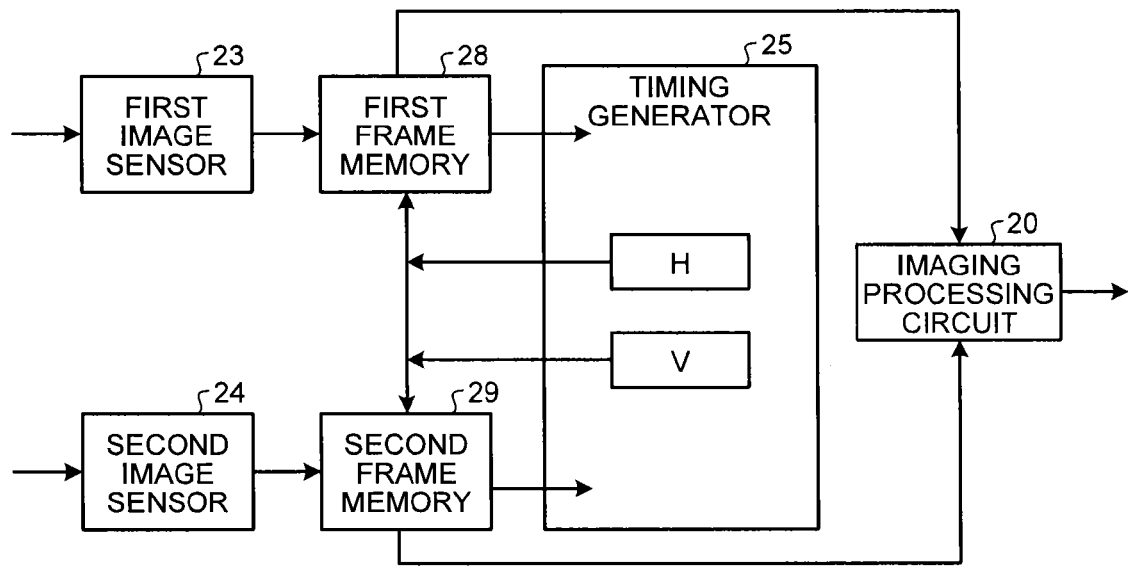
FIG. 5 is a block diagram for describing adjustment of a frame timing using a frame memory.

FIG. 5 is a block diagram for describing adjustment of a frame timing using a frame memory. A first frame memory 28 temporarily stores the RAW image data from the first image sensor 23. The second frame memory 29 temporarily stores the monochrome image data from the second image sensor 24. For example, the first frame memory 28 and the second frame memory 29 are included in the frame memory 26 (see FIG. 3).

The first frame memory 28 matches the frame timing of the stored RAW image data with the horizontal synchronous signal H and the vertical synchronous signal V, and then outputs the RAW image data. The second frame memory 29 matches the frame timing of the stored monochrome image data with the horizontal synchronous signal H and the vertical synchronous signal V, and then outputs the monochrome image data. The solid-state imaging device 12 may adjust the frame timing by any one of the configurations illustrated in FIGS. 4 and 5.

As illustrated in FIG. 3, the ISP 13 includes a camera interface (I/F) 31, an image acquiring unit 32, a signal processing circuit 33, and a driver interface (I/F) 34. The camera I/F 31 receives an input of image data from the solid-state imaging device 12. The image acquiring unit 32 acquires image data input to the camera I/F 31.

The signal processing circuit 33 executed signal processing on an image input to the image acquiring unit 32. The driver I/F 34 outputs the image data which has been subjected to signal processing by the signal processing circuit 33 to the storage unit 14 and the display unit 15 (see FIG. 1).

Figure 6:
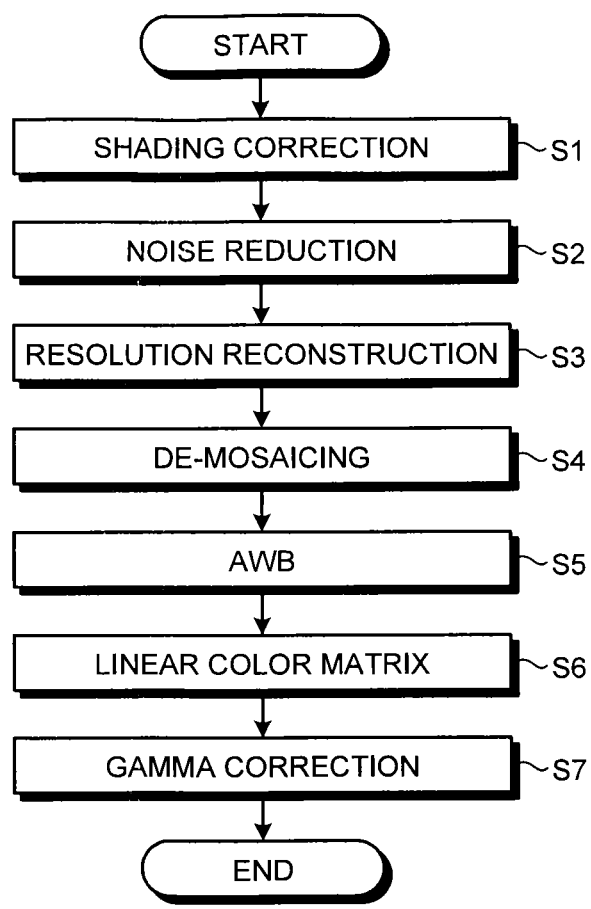
FIG. 6 is a flowchart for describing a process of signal processing by signal processing circuit of an ISP.

FIG. 6 is a flowchart for describing a process of signal processing by signal processing circuit of the ISP. The signal processing circuit 33 executes shading correction on an image input to the image acquiring unit 32 (step S1). The signal processing circuit 33 corrects non-uniform brightness caused by a light amount difference between a central portion and a peripheral portion on the first imaging lens 21 and the second imaging lens 22 through shading correction.

The signal processing circuit 33 executes noise reduction (step S2) of removing a noise such as a fixed pattern noise, a dark current noise, and a shot noise and a resolution reconstruction process (step S3). Next, the signal processing circuit 33 executes a pixel interpolation process (de-mosaicing) on a digital image signal transferred in the order of the Bayer array (step S4). Through the de-mosaicing, a sensitivity level value of a deficient color component is generated by an interpolation process of an image signal obtained by imaging. The signal processing circuit 33 synthesizes a color bitmap image by de-mosaicing.

The signal processing circuit 33 executes automatic white balance control (AWB) on the color image (step S5). In addition, the signal processing circuit 33 executes a linear color matrix process (step S6) and gamma correction (step S7). Through the linear color matrix process, color reproducibility of an image is improved. Through gamma correction, chroma and brightness of an image to be displayed on a display device or the like is corrected.

The signal processing process by the signal processing circuit 33 described in the present embodiment is an example, and addition of another process, omission of an optional process, a change of an order, or the like may be appropriately made.

The configuration of the camera module 10 for signal processing is divided into the imaging processing circuit 20 at a previous stage and the ISP 13 at a subsequent stage. In the camera module 10, the imaging processing circuit 20 and the ISP 13 function as an image processing apparatus that executes signal processing of the image signal acquired by the first image sensor 23 and the second image sensor 24.

The lens driving unit 27 drives the first imaging lens 21 and the second imaging lens 22 in a direction of the optical axis for focus adjustment of the first imaging lens 21 and the second imaging lens 22. The lens driving unit 27 collectively drives the first imaging lens 21 and the second imaging lens 22 by moving the lens holder 16. In the camera module 10, since the first imaging lens 21 and the second imaging lens 22 can be collectively driven, the configuration of the lens module 11 can be simplified compared to when the first imaging lens 21 and the second imaging lens 22 are separately driven.

Figure 7:
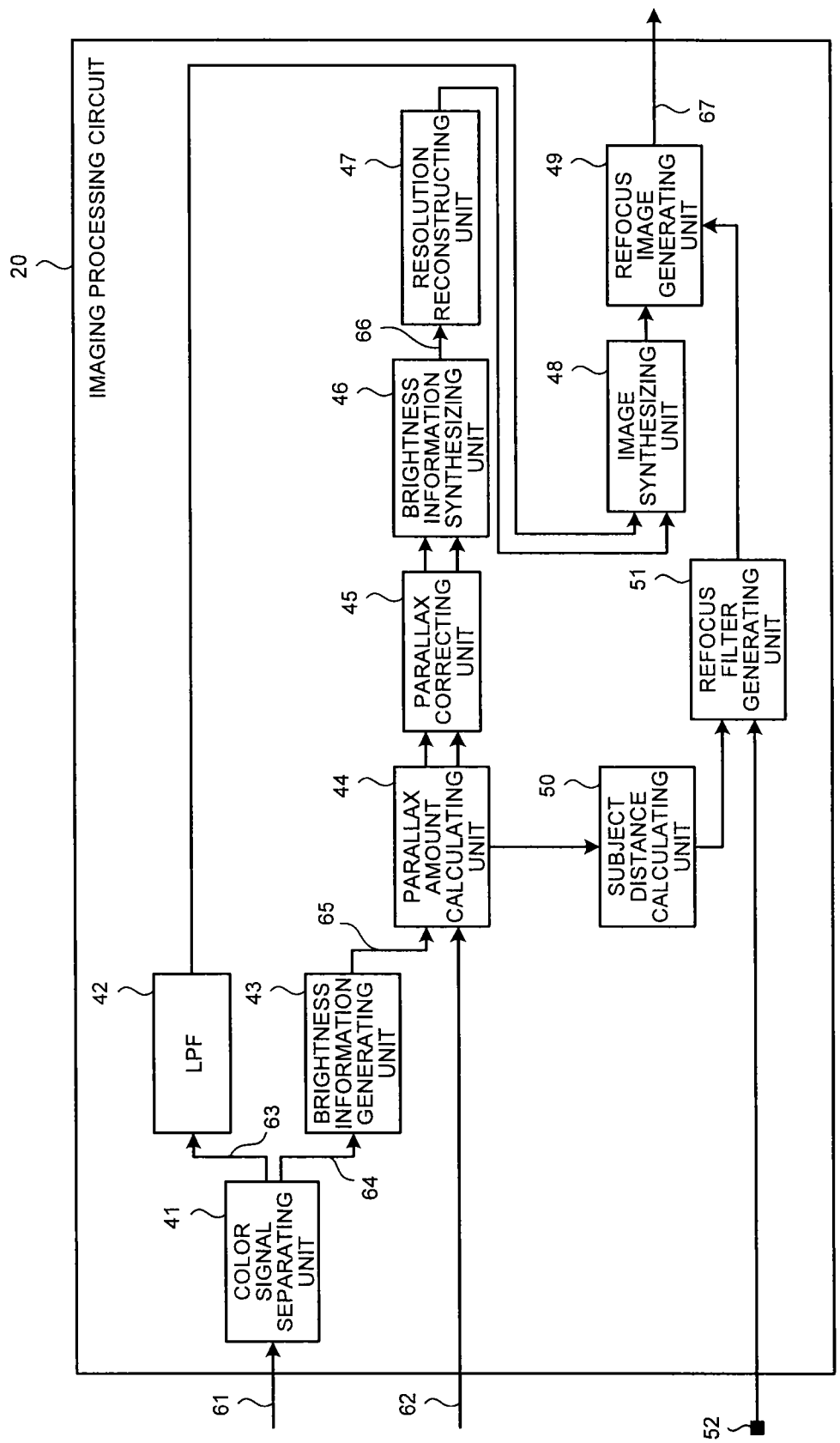
FIG. 7 is a block diagram illustrating the details of an imaging processing circuit.

FIG. 7 is a block diagram illustrating the details of the imaging processing circuit. The imaging processing circuit 20 includes a color signal separating unit 41, an low pass filter (LPF) 42, a brightness information generating unit 43, a parallax amount calculating unit 44, a parallax correcting unit 45, a brightness information synthesizing unit 46, a resolution reconstructing unit 47, an image synthesizing unit 48, a refocus image generating unit 49, a subject distance calculating unit 50, and a refocus filter generating unit 51. The RAW image data 61 from the first image sensor 23 and the monochrome image data 62 from the second image sensor 24 are input to the imaging processing circuit 20.

The color signal separating unit 41 separates the RAW image data 61 input from the first image sensor 23 into color information 63 and brightness information 64. For example, the color information 63 is information corresponding to a color difference component of a YUV color space. For example, the brightness information 64 is information corresponding to a brightness component of the YUV color space.

The brightness information generating unit 43 generates first brightness information 65 on a G component which is a specific color component based on the brightness information 64 extracted from the RAW image data 61 in the color signal separating unit 41.

Figures 8, 9:
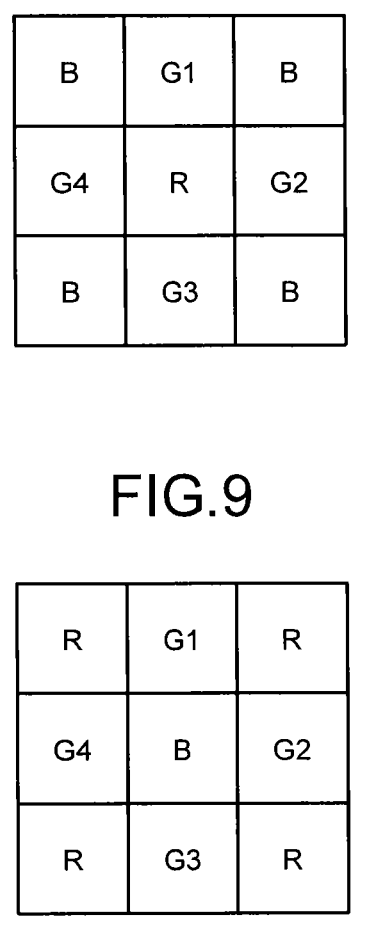

FIGS. 8 and 9 are diagrams for describing generation of the first brightness information in the brightness information generating unit. With respect to the R pixel and the B pixel, the brightness information generating unit 43 calculates a brightness value of the G component by the interpolation process of the brightness value detected by a surrounding G pixel.

For calculation of the brightness value of the G component on the R pixel, the brightness information generating unit 43 refers to brightness values detected by four G pixels included in a 3×3 pixel block centering on the R pixel, for example, as illustrated in FIG. 8. For example, the brightness information generating unit 43 may calculate brightness value of the G component in the R pixel by the following formula. In the formula, terms of "G1," "G2," "G3," and "G4" are brightness value of the G components, respectively, detected by G pixels (G1, G2, G3, and G4) illustrated in FIG. 8.

(brightness value of $G$ component in $R$ pixel)=($G1$+$G2$+$G3$+$G4$)/4

For calculation of the brightness value of the G component on the B pixel, the brightness information generating unit 43 refers to brightness values detected by four G pixels included in a 3×3 pixel block centering on the B pixel, for example, as illustrated in FIG. 9. For example, the brightness information generating unit 43 may calculate brightness value of the G component in the B pixel by the following formula.

(brightness value of $G$ component in $B$ pixel)=($G1$+$G2$+$G3$+$G4$)/4

The brightness information generating unit 43 outputs the brightness value detected by the G pixel and the brightness values of the G component calculated on the R pixel and the B pixel as the first brightness information 65. In the solid-state imaging device 12, among the R, G, and B components, the G component obtains most brightness information, and thus the first brightness information 65 on the G component is employed. The interpolation process technique by the brightness information generating unit 43 may be appropriately changed. For example, the brightness information generating unit 43 may generate the first brightness information 65 by a de-mosaicing process technique.

For example, the imaging processing circuit 20 temporarily stores the monochrome image data 62 and the first brightness information 65 in the frame memory 26 (see FIG. 3). The parallax amount calculating unit 44 calculates a parallax amount between the RAW image (a first image) acquired by the first image sensor 23 and the monochrome image (a second image) acquired by the second image sensor 24. The parallax amount calculating unit 44 calculates the parallax amount based on the first brightness information 65 and the monochrome image data 62 read from the frame memory 26.

The parallax amount calculating unit 44 regards the monochrome image data 62 as second brightness information, and uses the monochrome image data 62 for a calculation of the parallax amount. The second brightness information is brightness information included in the monochrome image data 62 serving as the second image signal and, for example, is information corresponding to the brightness component of the YUV color space. The parallax amount calculating unit 44 uses the monochrome image data 62 as the second brightness information as is, and may also use second brightness information obtained by a calculation process or the like on the monochrome image data 62. The calculation of the parallax amount and the focus adjustment according to the parallax amount will be described later.

The parallax correcting unit 45 corrects a parallax between the brightness image of the G component by the first brightness information 65 and the monochrome image by the monochrome image data 62 based on the parallax amount calculated by the parallax amount calculating unit 44. For example, the parallax correcting unit 45 corrects the parallax of the monochrome image based on the brightness image of the G component. The parallax correcting unit 45 may correct the parallax of the brightness image of the G component based on the monochrome image. In this case, the imaging processing circuit 20 executes the same parallax correction as on the brightness image of the G component on the color information 63. The brightness information synthesizing unit 46 generates synthesized brightness information 66 by synthesizing the first brightness information 65 and the monochrome image data 62 which have been subjected to the parallax correction in the parallax correcting unit 45.

The resolution reconstructing unit 47 executes the resolution reconstruction on the synthesized image by the synthesized brightness information 66. The resolution reconstructing unit 47 estimates lens characteristic of the first imaging lens 21 and the second imaging lens 22 such as a blurring amount, and executes the resolution reconstruction based on the estimated lens characteristic. For example, a point spread function (PSF) is used as the lens characteristic. For example, an estimation method based on a least-square technique is used for estimation of the PSF. A resolution reconstruction effect depends on an algorithm used for reconstruction. For example, the resolution reconstructing unit 47 uses a Richardson-Lucy technique in order to reconstruct an image close to an original subject image.

In order to obtain a reliably resolution reconstruction effect, the camera module 10 holds individual information of each of the first imaging lens 21, the second imaging lens 22, the first image sensor 23, and the second image sensor 24 such as a manufacturing error or a lens characteristics in advance. For example, the individual information is stored in a one time programmable memory (OTP) (not illustrated) in the solid-state imaging device 12 or the ISP 13.

The LPF 42 executes a smoothing process on the color information 63 from the color signal separating unit 41. The LPF 42 reduces a color noise by the smoothing process of the color information 63. The imaging processing circuit 20 may executes, for example, a noise reduction process on the color information 63 instead of the smoothing process by the LPF 42.

The image synthesizing unit 48 generates synthesized image data by synthesizing the synthesized brightness information 66 that has subjected to the resolution reconstruction by the resolution reconstructing unit 47 and the color information 63 that has been subjected to the smoothing process by the LPF 42.

The solid-state imaging device 12 can obtain the second brightness information having a contour component that is high in a signal to noise ratio (SNR) and the resolution through the second image sensor 24. Since the vivid contour component is obtained from the second brightness information, with respect to the RAW image data 61 from the first image sensor 23, the imaging processing circuit 20 may extract the color information 63 before the brightness information 64 in the color signal separating unit 41. As a result, the imaging processing circuit 20 can obtain high sensitivity on the color component as well as the contour component.

The image synthesizing unit 48 is not limited to the example of generating the synthesized image data including the synthesized brightness information 66 and the color information 63 which is obtained by synthesizing the first brightness information 65 and the second brightness information. The image synthesizing unit 48 preferably generates the synthesized image data including at least the color information 63 and the second brightness information. The imaging processing circuit 20 can obtain high sensitivity on the color component and the contour component by including at least the color information 63 and the second brightness information in the synthesized image data.

The subject distance calculating unit 50 generates a depth map based on the parallax amount calculated in the parallax amount calculating unit 44. The subject distance calculating unit 50 calculates a subject distance from a subject based on the parallax amount. The subject distance calculating unit 50 calculates the subject distance on each of a plurality of subjects projected on the RAW image (the first image) and the monochrome image (the second image).

The refocus filter generating unit 51 generates a refocus filter used for an image refocus process. Data of the subject distance calculated by the subject distance calculating unit 50 and a refocus instruction 52 are input to the refocus filter generating unit 51.

The refocus instruction 52 is a signal used to designate a subject to be focused and sighted. For example, the refocus instruction 52 is output from the ISP 13 (see FIG. 2) when the position of a desired subject among subjects projected on an image displayed on the display unit 15 (see FIG. 2) is touched.

The refocus filter generating unit 51 selects the subject distance of the subject designated by the refocus instruction 52 among the subject distances of a plurality of subjects input from the subject distance calculating unit 50. The refocus filter generating unit 51 adjusts a filtering level according to the selected subject distance.

The refocus image generating unit 49 generates refocus image data 67 by executing a filtering process using the refocus filter from the refocus filter generating unit 51 on the synthesized image data output from the image synthesizing unit 48. The imaging processing circuit 20 outputs the refocus image data 67 generated by the refocus image generating unit 49.

Figure 10:
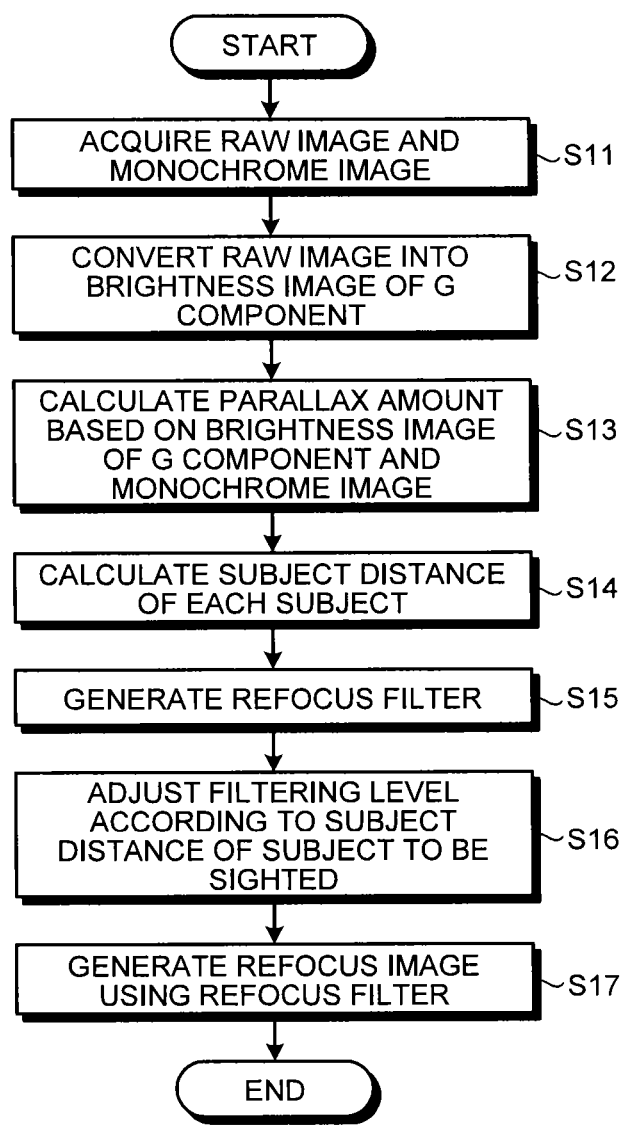
FIG. 10 is a flowchart illustrating a process of generating a refocus image using a camera module.

FIG. 10 is a flowchart illustrating a process of generating a refocus image using a camera module. The solid-state imaging device 12 acquires a RAW image serving as the first image by imaging by the first image sensor 23, and acquires a monochrome image serving as the second image by imaging by the second image sensor 24 (step S11).

The solid-state imaging device 12 converts the RAW image into the brightness image of the G component by generating the first brightness information 65 from the RAW image data 61 in the brightness information generating unit 43 (step S12). The parallax amount calculating unit 44 calculates the parallax amount based on the brightness image of the G component and the monochrome image (step S13).

Figure 11:
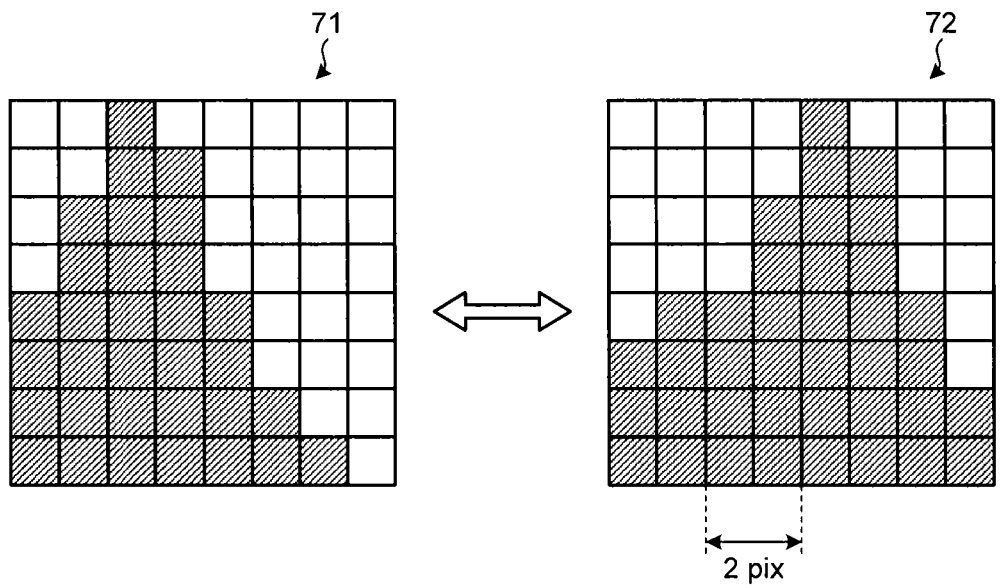
FIG. 11 is a diagram for describing a calculation of a parallax amount based on a brightness image of a G component and a monochrome image.

FIG. 11 is a diagram for describing a calculation of the parallax amount based on the brightness image of the G component and the monochrome image. In this example, the parallax amount calculating unit 44 (see FIG. 7) converts a deviation of a monochrome image 72 into the number of pixels based on a brightness image 71 of the G component and uses the number of pixels as the parallax amount. For example, the parallax amount calculating unit 44 simply calculates a deviation between images by employing a block matching technique.

In the illustrated example, the monochrome image 72 is deviated from the brightness image 71 of the G component by two pixels in a right direction. In this case, the parallax amount calculating unit 44 outputs the number of pixels, that is, "2" as the parallax amount. The parallax amount calculating unit 44 calculates the parallax amount on each of a plurality of subjects projected in the brightness image 71 and the monochrome image 72. The subject distance calculating unit 50 (see FIG. 3) calculates the subject distance of each subject according to the parallax amount obtained in step S13 (step S14).

Figure 12:
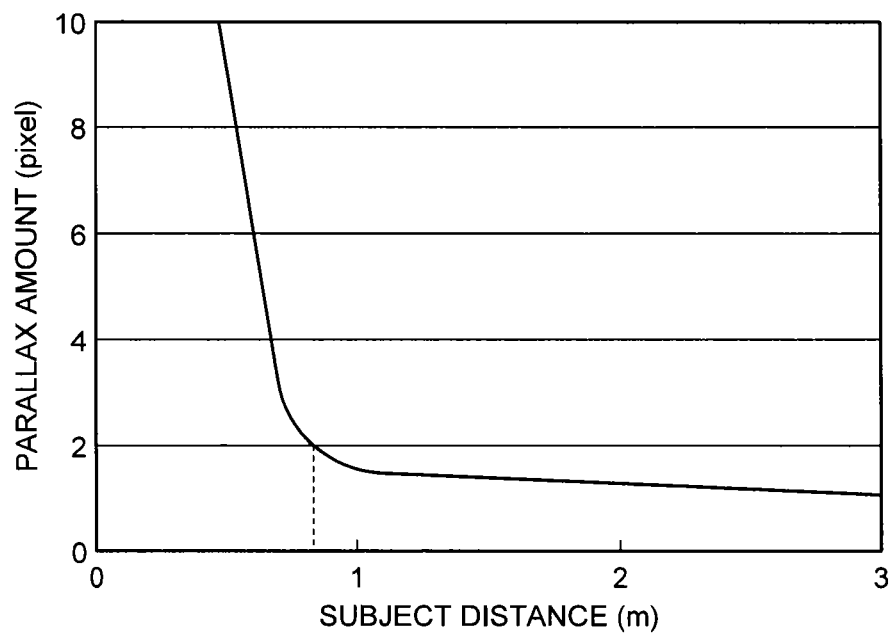
FIG. 12 is a diagram for describing a calculation of a subject distance in a subject distance calculating unit.

FIG. 12 is a diagram for describing a calculation of a subject distance in the subject distance calculating unit. The subject distance calculating unit 50 obtains a subject distance based on the distance between the first imaging lens 21 and the second imaging lens 22 and the parallax amount. For example, a relation between the parallax amount and the subject distance as illustrated in a graph of FIG. 12 is represented on a previously decided distance between the first imaging lens 21 and the second imaging lens 22. The subject distance calculating unit 50 outputs "0.7 (m)" as the subject distance corresponding to, for example, the parallax amount "2 (pixels)" based on the relation between the parallax amount and the subject distance.

The refocus filter generating unit 51 generates the refocus filter used as a reference in the image refocus process (step S15). The refocus filter generating unit 51 selects a subject distance of a subject to be sighted a reference according to the refocus instruction 52.

The refocus filter generating unit 51 adjusts the filtering level of the refocus filter such that the blurring amount increases as the position of the selected subject distance gets away from (step S16). The refocus image generating unit 49 generates a refocus image by a convolution calculation using the refocus filter output from the refocus filter generating unit 51 through adjustment in step S16 (step S17). As a result, the camera module 10 ends the process of generating the refocus image.

The camera module 10 acquires the RAW image and the monochrome image having the parallax therebetween using the first and second image sensors 23 and 24. The camera module 10 can obtain the refocus image focused on the subject appropriately designated by the refocus instruction 52 by calculating the subject distance according to the parallax amount for each subject.

According to the first embodiment, the camera module 10 can use the first and second image sensors 23 and 24 applied for high-sensitivity capturing for the refocus function. The camera module 10 can employ a twin-lens configuration which can be used for other instead of an optical system used only for the refocus function such as a lens array installed between an imaging lens and an image sensor. Thus, the camera module 10 can implement the refocus function through the simpler configuration than when a dedicated optical system for the refocus function is applied.

The solid-state imaging device 12 according to the present embodiment acquires the first brightness information 65 and the color information 63 from the RAW image, and acquires the monochrome image data 62 serving as the second brightness information from the monochrome image. The imaging processing circuit 20 obtains the high-sensitivity synthesized image by synthesizing the second brightness information from the W pixel with sensitivity higher than other color pixels and the first brightness information 65 generated on the G component through the brightness information synthesizing unit 46. The solid-state imaging device 12 secures high color reproducibility by synthesizing the color information 63 acquired from the RAW image through the imaging processing circuit 20.

The solid-state imaging device 12 can prevent the color reproducibility from being lowered due to crosstalk compared to when an image sensor in which the W pixel is mixed with each color pixel is used. Further, the solid-state imaging device 12 can prevent the sensitivity of each color component from being lowered as an output of the W pixel is saturated before each color pixel.

In addition, the camera module 10 can be more compact and reduced in size since it is not necessary to secure a long focal distance necessary to cope with an increase in the size of a pixel. Thus, the camera module 10 can have a compact and small configuration and can capture an image that is high in sensitivity, high in the resolution, and excellent in the color reproducibility.

At least some of the components of the imaging processing circuit 20 illustrated in FIG. 7 may be disposed in the signal processing circuit 33 of the ISP 13. At least part of the process illustrated in FIG. 6, which is executed by the signal processing circuit 33 may be executed by the imaging processing circuit 20. The solid-state imaging device 12 may not include the frame memory 26 depending on configuration forms of the imaging processing circuit 20 and the signal processing circuit 33.

As an application of the first embodiment, at least some of the process of calculating the parallax amount, the process of calculating the subject distance, the process of generating the refocus filter, and the process of generating the refocus image may be executed, for example, by a computer connected to the camera module 10.

FIG. 13 is a chart for describing a modified example related to acquisition of synthesized brightness information by synthesis of the first brightness information and the second brightness information. In the chart, a type 1 represents a form described in the present embodiment. In the type 1, the solid-state imaging device 12 includes the second image sensor 24 in which the W pixels are arranged in parallel and the first image sensor 23 in which the R, G, and B pixels are arranged in the Bayer array form. The solid-state imaging device 12 acquires the second brightness information including the brightness value of the W component and the first brightness information 65 of the G component acquired through the interpolation process of the RAW image data 61.

In a type 2, the solid-state imaging device 12 uses the second image sensor 24 in which the G pixels are arranged in parallel and the same first image sensor 23 as in the type 1. The solid-state imaging device 12 acquires the second brightness information including the brightness value of the G component. The solid-state imaging device 12 acquires the first brightness information 65 of the G component, similarly to the type 1.

FIG. 14 is a diagram for describing an arrangement of pixels in a color image sensor used in a type 3. In the type 3, the first image sensor 23 in which the R and B pixels are alternately arranged in parallel is used. The solid-state imaging device 12 uses the first image sensor 23 and the same second image sensor 24 as in the type 2. The solid-state imaging device 12 acquires the second brightness information including the brightness value of the G component, similarly to the type 2.

The color signal separating unit 41 (see FIG. 7) extracts the brightness information 64 on the R component and the B component from the RAW image data 61. The brightness information generating unit 43 acquires the brightness value of the R component and the brightness value of the B component on the respective pixels by the interpolation process of the brightness information 64. The brightness information generating unit 43 adds the brightness value of the R component and the brightness value of the B component and uses an addition result as a brightness value of a magenta (M) component. In the type 3, the first brightness information 65 including the brightness value of the M component is acquired.

FIG. 15 is a diagram for describing an arrangement of pixels in a first image sensor used in a type 4. In a type 4, the first image sensor 23 in which cyan (C) and yellow (Y) pixels are alternately arranged in parallel is used. The solid-state imaging device 12 uses the first image sensor 23 and the same second image sensor 24 as in the type 2.

The solid-state imaging device 12 acquires the second brightness information including the brightness value of the G component, similarly to the type 2. The color signal separating unit 41 extracts the brightness information 64 on the C component and the Y component from the RAW image data

61. The brightness information generating unit 43 acquires the brightness value of the C component and the brightness value of the Y component on the respective pixels through the interpolation process of the brightness information 64.

Figures 16, 17:
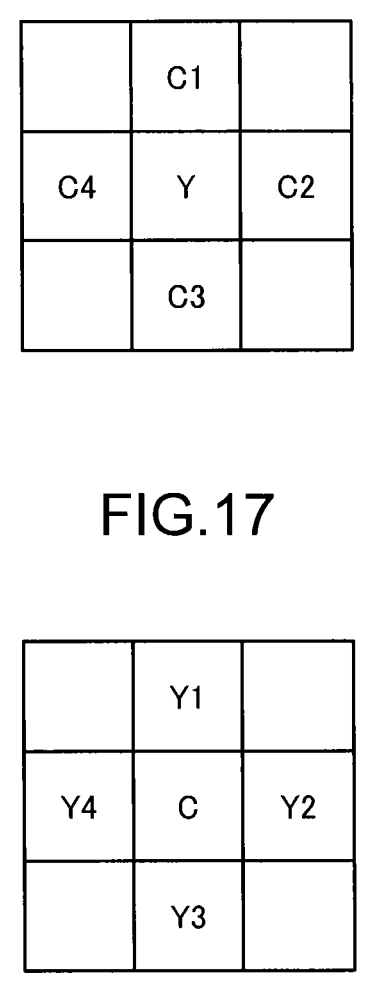

FIG. 16 is a diagram for describing a calculation of the brightness value of the C component on the Y pixel. For example, the brightness information generating unit 43 refers to brightness values detected by four C pixels included in a 3×3 pixel block centering on the Y pixel. For example, the brightness information generating unit 43 calculates the brightness value of the C component on the Y pixel through the following formula. In the formula, terms of "C1," "C2," "C3," and "C4" are the brightness values of the C components detected by the C pixels (C1, C2, C3, and C4) illustrated in FIG. 16.

(brightness value of $C$ component in $Y$ pixel)=$(C1+C2+C3+C4)/4$

FIG. 17 is a diagram for describing a calculation of the brightness value of the Y component on the C pixel. For example, the brightness information generating unit 43 refers to brightness values detected by four Y pixels included in a 3×3 pixel block centering on the C pixel. For example, the brightness information generating unit 43 calculates the brightness value of the Y component on the C pixel through the following formula. In the formula, terms of "Y1," "Y2," "Y3," and "Y4" are the brightness values of the Y components detected by the Y pixels (Y1, Y2, Y3, and Y4) illustrated in FIG. 17.

(brightness value of $Y$ component in $C$ pixel)=$(Y1+Y2+Y3+Y4)/4$

The brightness information generating unit 43 adds the brightness value of the C component and the brightness value of the Y component, and uses an addition result as the brightness value of the G component. In the type 4, the first brightness information 65 including the brightness value of the G component is acquired. Even when any of the types 1 to 4 is employed, the solid-state imaging device 12 can capture an image that is high in sensitivity and the resolution and excellent in the color reproducibility. In the types 3 and 4, similarly to the type 1, the second brightness information including the brightness value of the W component may be acquired.

Figure 18:
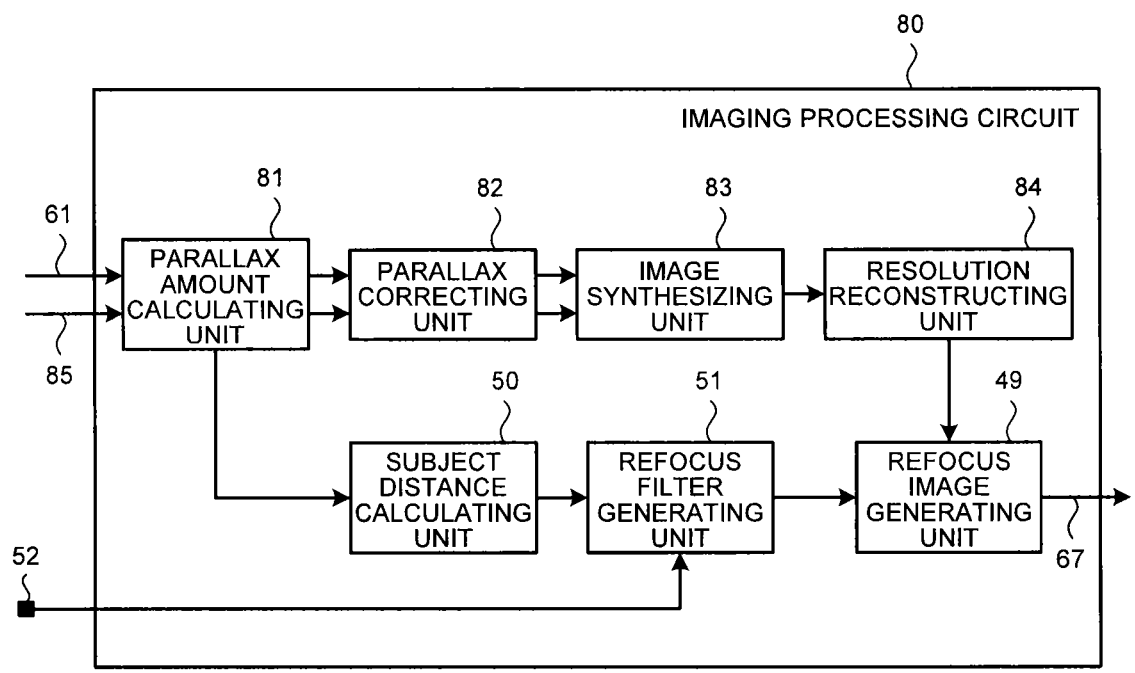
FIG. 18 is a block diagram illustrating a configuration of an imaging processing circuit applied to a camera module according to a second embodiment.

FIG. 18 is a block diagram illustrating a configuration of an imaging processing circuit applied to a camera module according to a second embodiment. The camera module according to the present embodiment uses a color image sensor that detects a plurality of pieces of color light as the second image sensor 24 (see FIG. 3). The same components as in the first embodiment are denoted by the same reference numerals, and a duplicated description will not be appropriately made.

For example, the second image sensor 24 includes R pixels, G pixels, and B pixels, which are arranged in the Bayer array form. The second image sensor 24 outputs RAW image data 85. The RAW image data 85 is a second image signal according to an intensity distribution of each color light incident from a subject.

An imaging processing circuit 80 includes a parallax amount calculating unit 81, a parallax correcting unit 82, an image synthesizing unit 83, a resolution reconstructing unit 84, a subject distance calculating unit 50, a refocus filter generating unit 51, and a refocus image generating unit 49.

The parallax amount calculating unit 81 calculates a parallax amount between a first RAW image acquired by the first image sensor 23 and a second RAW image acquired by the second image sensor 24 using the RAW image data 61 input from the first image sensor 23 and the RAW image data 85 input from the second image sensor 24. For example, the parallax amount calculating unit 81 converts a deviation of the second RAW image into the number of pixels based on the first RAW image and uses the number of pixels as the parallax amount.

The parallax correcting unit 82 corrects the parallax between the first RAW image and the second RAW image. The image synthesizing unit 83 synthesizes the RAW image data 61 and 85 that have been subjected to the parallax correction in the parallax correcting unit 82. The resolution reconstructing unit 84 executes the resolution reconstruction on the synthesized image by the image synthesizing unit 83.

The subject distance calculating unit 50 calculates a subject distance from a subject based on the parallax amount calculated in the parallax amount calculating unit 81. The subject distance calculating unit 50 calculates the subject distance on each of a plurality of subjects projected on the first RAW image (the first image) and the second RAW image (the second image).

The refocus image generating unit 49 generates refocus image data 67 by executing the filtering process using the refocus filter from the refocus filter generating unit 51 on the synthesized image data output from the resolution reconstructing unit 84. The imaging processing circuit 80 outputs the refocus image data 67 generated by the refocus image generating unit 49.

According to the second embodiment, the camera module 10 can implement the refocus function through the simple configuration. Further, the camera module 10 can capture an image that is high in sensitivity and excellent in color reproducibility.

Figure 19:
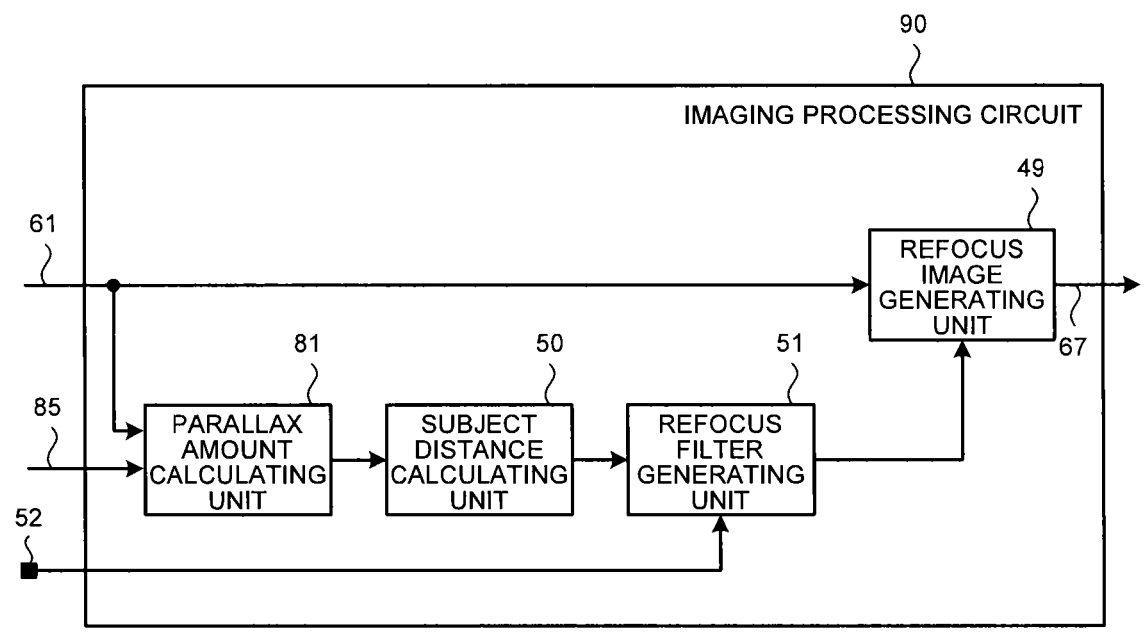
FIG. 19 is a block diagram illustrating a configuration of an imaging processing circuit applied to a camera module according to a third embodiment.

FIG. 19 is a block diagram illustrating a configuration of an imaging processing circuit applied to a camera module according to a third embodiment. The same components as in the first and second embodiments are denoted by the same reference numerals, and a duplicated description will not be appropriately made.

The second image sensor 24 (see FIG. 3) is a color image sensor that detects a plurality of pieces of color light, similarly to the second embodiment. The number of pixels of the second image sensor 24 is smaller than the number of pixels of the first image sensor 23. In the present embodiment, the first image sensor 23 is an image sensor that is used to mainly acquire image data. The second image sensor 24 calculates the subject distance together with the first image sensor 23 and thus is an additionally used image sensor.

An imaging processing circuit 90 includes a parallax amount calculating unit 81, a subject distance calculating unit 50, a refocus filter generating unit 51, and a refocus image generating unit 49.

The refocus image generating unit 49 generates refocus image data 67 by executing the filtering process using the refocus filter from the refocus filter generating unit 51 on the RAW image data 61 input from the first image sensor 23. The refocus image generating unit 49 generates the refocus image by executing the filtering process using the refocus filter on the first RAW image (the first image) acquired by the first image sensor 23.

According to the second embodiment, the camera module 10 can implement the refocus function through the simple configuration. Further, the camera module 10 uses the second image sensor 24 which is smaller in the number of pixels than the first image sensor 23, and thus the manufacturing cost can be reduced compared to the case of using the second image sensor 24 which is equal in the number of pixels to the first image sensor 23.

In the present embodiment, the second image sensor 24 may be equal in the number of pixels to the first image sensor 23. A monochrome image sensor may be used as the second image sensor 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module, comprising:
   a first imaging lens and a second imaging lens each of which introduces light from a subject and forms a subject image;
   a first image sensor that acquires a first image by imaging the subject image formed by the first imaging lens, and outputs a first image signal;
   a second image sensor that acquires a second image by imaging the subject image formed by the second imaging lens, and outputs a second image signal; and
   an image processing apparatus that executes signal processing on the first image signal from the first image sensor and the second image signal from the second image sensor,
   wherein the image processing apparatus includes
      a parallax amount calculating unit that calculates a parallax amount between the first image and the second image based on the first image signal and the second image signal,
      a subject distance calculating unit that calculates a subject distance from the subject based on the parallax amount calculated by the parallax amount calculating unit,
      a refocus filter generating unit that generates a refocus filter whose filtering level is adjusted according to the subject distance of a subject to be focused and sighted among a plurality of subjects projected in the first image and the second image, and
      a refocus image generating unit that executes a filtering process using the refocus filter generated by the refocus filter generating unit and generates a refocus image, and
   wherein the parallax amount calculating unit calculates the parallax amount based on first brightness information that is brightness information generated from the first image signal and second brightness information that is brightness information generated from the second image signal.

2. The camera module according to claim 1,
   wherein the image processing apparatus further includes an image synthesizing unit that generates a synthesized image of the first image and the second image, and
   the refocus image generating unit executes the filtering process on the synthesized image.

3. The camera module according to claim 1, wherein the first image sensor is a color image sensor that detects a plurality of pieces of color light.

4. The camera module according to claim 3,
   wherein the image processing apparatus further includes a brightness information generating unit that generates the first brightness information on a specific color component from the first image signal.

5. The camera module according to claim 3,
   wherein the image processing apparatus further includes an image synthesizing unit that generates a synthesized image that includes at least the second brightness information of the first brightness information and the second brightness information, and includes color information generated from the first image signal, and
   the refocus image generating unit executes the filtering process on the synthesized image.

6. The camera module according to claim 1, wherein the second image sensor is a monochrome image sensor that detects single-color light.

7. The camera module according to claim 6,
   wherein the second brightness information is monochrome image data that is the second image signal acquired by the monochrome image sensor.

8. The camera module according to claim 1,
   wherein each of the first image sensor and the second image sensor is a color image sensor that detects a plurality of pieces of color light, and
   the parallax amount calculating unit calculates the parallax amount based on RAW image data that is the first image signal and RAW image data that is the second image signal.

9. The camera module according to claim 1,
   wherein the refocus image generating unit executes the filtering process on the first image.

10. The camera module according to claim 9,
    wherein the number of pixels of the second image sensor is smaller than the number of pixels of the first image sensor.

11. The camera module according to claim 1, further comprising
    a lens driving unit that performs a focus adjustment of the first imaging lens and the second imaging lens,
    wherein the lens driving unit collectively drives the first imaging lens and the second imaging lens.

12. The camera module according to claim 1,
    wherein the refocus filter generating unit selects the subject distance according to a refocus instruction that is a signal used to designate the subject to be sighted, and adjusts the filtering level.

13. An image processing apparatus, comprising:
    a parallax amount calculating unit that calculates a parallax amount between a first image and a second image having parallax on the first image based on a first image signal corresponding to the first image and a second image signal corresponding to the second image;
    a subject distance calculating unit that calculates a subject distance from a subject based on the parallax amount calculated by the parallax amount calculating unit,
    a refocus filter generating unit that generates a refocus filter whose filtering level is adjusted according to the subject distance of a subject to be focused and sighted among a plurality of subjects projected in the first image and the second image; and
    a refocus image generating unit that executes a filtering process using the refocus filter generated by the refocus filter generating unit so as to generate a refocus image,
    wherein the parallax amount calculating unit calculates the parallax amount based on first brightness information that is brightness information generated from the first image signal and second brightness information that is brightness information generated from the second image signal.

14. The image processing apparatus according to claim 13, further comprising
an image synthesizing unit that generates a synthesized image that includes at least the second brightness information of the first brightness information and the second brightness information, and includes color information generated from the first image signal.

15. The image processing apparatus according to claim 13, wherein the first image signal is RAW image data acquired by a color image sensor that detects a plurality of pieces of color light, and
the second image signal is monochrome image data acquired by a monochrome image sensor that detects single-color light.

16. The image processing apparatus according to claim 15, further comprising
an image synthesizing unit that generates a synthesized image of the first image and the second image,
wherein the refocus image generating unit executes the filtering process on the synthesized image.

17. The image processing apparatus according to claim 13, wherein the refocus filter generating unit selects the subject distance according to a refocus instruction that is a signal used to designate the subject to be sighted, and adjusts the filtering level.

18. An image processing method, comprising:
calculating a parallax amount between a first image and a second image having parallax on the first image based on a first image signal corresponding to the first image and a second image signal corresponding to the second image;
calculating a subject distance from a subject based on the parallax amount;
generating a refocus filter whose filtering level is adjusted according to the subject distance of a subject to be focused and sighted among a plurality of subjects projected in the first image and the second image; and
executing a filtering process using the refocus filter so as to generate a refocus image,
wherein said calculating the parallax amount is based on first brightness information that is brightness information generated from the first image signal and second brightness information that is brightness information generated from the second image signal.

* * * * *